United States Patent
Weizman et al.

(10) Patent No.: US 11,783,004 B2
(45) Date of Patent: Oct. 10, 2023

(54) IDENTIFYING A SCRIPT THAT ORIGINATES SYNCHRONOUS AND ASYNCHRONOUS ACTIONS

(71) Applicant: PerimeterX, Inc., San Mateo, CA (US)

(72) Inventors: Gal Weizman, Tel Aviv (IL); Itai Sadan, Tel Aviv (IL)

(73) Assignee: PERIMETERX, INC., San Mateo, CA (US)

( * ) Notice: Subject to any disclaimer, the term of this patent is extended or adjusted under 35 U.S.C. 154(b) by 0 days.

(21) Appl. No.: 17/002,700

(22) Filed: Aug. 25, 2020

(65) Prior Publication Data
US 2021/0064685 A1    Mar. 4, 2021

Related U.S. Application Data

(60) Provisional application No. 62/891,532, filed on Aug. 26, 2019.

(51) Int. Cl.
  *G06F 16/95*   (2019.01)
  *G06F 16/957*  (2019.01)
  *G06F 9/54*    (2006.01)
  *G06F 9/38*    (2018.01)
  *G06F 16/958*  (2019.01)

(52) U.S. Cl.
  CPC ........ *G06F 16/9577* (2019.01); *G06F 9/3871* (2013.01); *G06F 9/541* (2013.01); *G06F 16/958* (2019.01)

(58) Field of Classification Search
  CPC .. G06F 16/9577; G06F 16/958; G06F 9/3871; G06F 9/541
  See application file for complete search history.

(56) References Cited

U.S. PATENT DOCUMENTS

| | | | |
|---|---|---|---|
| 7,523,191 B1 | 4/2009 | Thomas et al. | |
| 9,602,329 B1* | 3/2017 | Stehle | G06F 9/547 |
| 2008/0085502 A1 | 4/2008 | Allen et al. | |
| 2008/0271046 A1 | 10/2008 | Lipton et al. | |
| 2011/0264787 A1 | 10/2011 | Mickens et al. | |
| 2013/0073401 A1 | 3/2013 | Cook | |
| 2013/0198603 A1* | 8/2013 | Gokhman | G06F 16/958 |
| | | | 715/234 |
| 2013/0290480 A1 | 10/2013 | Manion et al. | |

(Continued)

OTHER PUBLICATIONS

International Search Report and Written Opinion, Patent Cooperation Treaty Application, No. PCT/US2020/048012, dated Nov. 19, 2020, fourteen pages.

*Primary Examiner* — Hope C Sheffield
(74) *Attorney, Agent, or Firm* — SQUIRE PATTON BOGGS (US) LLP (57) ABSTRACT

A browser can include a script monitoring module to monitor executing scripts and log the initiating scripts for API calls or other monitored actions. In some embodiments, the script monitoring module overwrites built-in or web APIs in the browser with versions of the APIs that allow the script monitoring module to identify the scripts calling the APIs. Using the script monitoring module, the script initiating an action (such as an API call) can be identified using features of the browser. In some embodiments, all actions may be monitored in this way, permitting the tracking and analysis of scripts and full analysis of interaction between such scripts on the webpage and with the browser.

19 Claims, 4 Drawing Sheets

(56) References Cited

U.S. PATENT DOCUMENTS

| | | | |
|---|---|---|---|
| 2013/0298007 A1* | 11/2013 | Cullen | G06F 3/0481 |
| | | | 715/234 |
| 2015/0095923 A1* | 4/2015 | Sarid | G06F 8/30 |
| | | | 719/328 |
| 2015/0227362 A1* | 8/2015 | Dvinsky | G06F 8/31 |
| | | | 717/120 |
| 2016/0080345 A1 | 3/2016 | Safruti et al. | |

* cited by examiner

IDENTIFYING A SCRIPT THAT ORIGINATES SYNCHRONOUS AND ASYNCHRONOUS ACTIONS

CROSS REFERENCE TO RELATED APPLICATIONS

This application claims the benefit of U.S. Provisional Application No. 62/891,532, filed Aug. 26, 2019, which is incorporated by reference in its entirety.

BACKGROUND

This disclosure generally relates to script monitoring in a browser environment and, in particular, to tracking a scripts initiated an API call.

Webpages loaded into a web browser can contain scripts in addition to the page content for display to the end user. Each script can take a variety of actions within the browser to modify displayed page content, gather data about the browser or computing device accessing the webpage, or the like. Additionally, scripts within a webpage can be from different sources (for example, when the webpage has content from multiple sources). However, web browsers have limited ability to track the initiating script of any given action or API call. Some inbuilt script monitoring functionality may exist (such as currentScript in Javascript), but it is limited and not directly applicable to all situations where script tracking can be useful.

SUMMARY

In order to monitor scripts, a browser can include a script monitoring module to monitor executing scripts and log the initiating scripts for API calls or other monitored actions. In some embodiments, the script monitoring module overwrites built-in or web APIs in the browser with versions of the APIs that allow the script monitoring module to identify the scripts calling the APIs. Using the script monitoring module, the script initiating an action (such as an API call) can be identified using features of the browser. In some embodiments, all actions may be monitored in this way, permitting the tracking and analysis of scripts and full analysis of interaction between such scripts on the webpage and with the browser.

Scripts may take a variety of actions within a browser, such that gathering information about which scripts take which actions can be useful to, for example, detect scripts initiating unexpected or unauthorized actions, track the performance impact of various scripts, or the like. A log of scripts generated by a script monitoring module can allow the webpage, locally executing JavaScript, or the browser to monitor everything that happens in the browser when visiting the webpage and the actions initiated by the webpage (and including those from scripts invoked by the webpage).

The figures depict various embodiments for purposes of illustration only. One skilled in the art will recognize that alternative embodiments of the structures and methods illustrated herein may be employed without departing from the principles described herein.

DETAILED DESCRIPTION

Overview

A script monitoring module incorporated into a browser can allow the browser to link a script in a currently loaded webpage to actions (such as a web API call) taking place in the browser initiated by the script. The script monitoring module can function for actions initiated synchronously or asynchronously by the initiating script. In some embodiments, the script monitoring module can overwrite built-in or web APIs in the browser with versions that allow the script monitoring module to identify the scripts that call the overwritten APIs. Using the script monitoring module, the script initiating an action (such as an API call) can be identified using features of the browser (for example, currentScript for JavaScript scripts). In some embodiments, all actions may be monitored in this way, permitting the tracking and analysis of scripts and full analysis of interaction between such scripts on the webpage and with the browser.

In some implementations, tracking certain asynchronous actions (such as actions initiated with a call to an asynchronous API) is more difficult than tracking synchronous actions. In some cases, asynchronous actions cannot be monitored using only the inbuilt tracking tools (such as currentScript) which may not support tracking the initiator of asynchronously executed code. Therefore, the script monitoring module can also overwrite asynchronous APIs in the browser to include additional functionality for detecting the current running script (at the time the asynchronous API was called) and storing the initiating script until the associated asynchronous callback is triggered.

Knowing which script has initiated what action on the webpage can useful to create a map of each action taking place in the webpage alongside an initiating script for each of these actions. This map (and analysis identifying the initiating scripts) may therefore allow the webpage, locally executing JavaScript, or the browser to monitor everything that happens in the browser when visiting the webpage and the actions initiated by the webpage (and including those from scripts invoked by the webpage).

System Architecture

Figure 1:
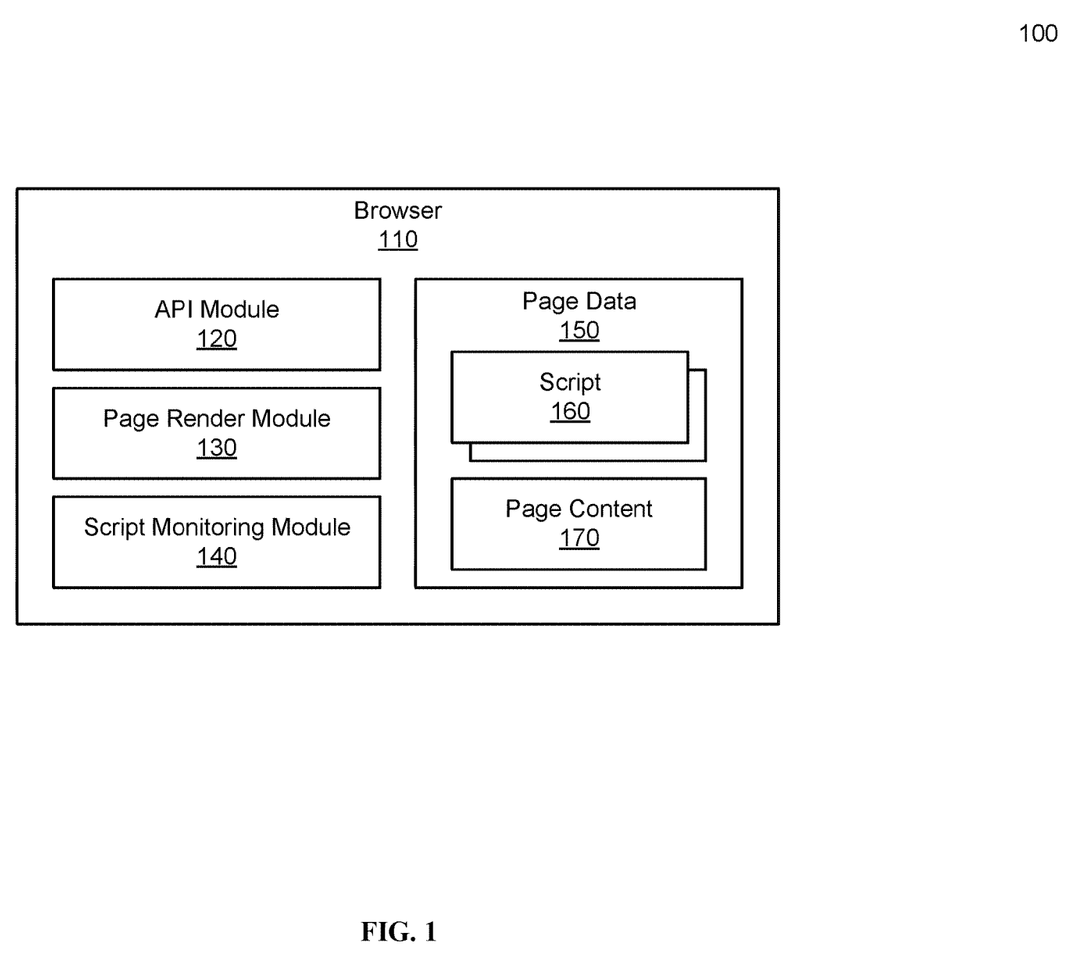
FIG. 1 is a block diagram of a system environment in which a script monitoring system operates, in accordance with an embodiment.

FIG. 1 is a block diagram of a system environment in which a script monitoring system operates, in accordance with an embodiment. The system environment 100 of FIG. 1 comprises a browser 110 including an API module 120, a page render module 130, a script monitoring module 140, and page data 150. The page data 150 can include one or more scripts 160 and page content 170 for display.

The browser 110 can be a web browser or other program capable of retrieving and interpreting page data 150 for a webpage (or other source of content). In some embodiments the browser 110 operates on a client device such as a personal computer or smartphone and can generate a graphical user interface for display to a user of the client device based on received page data 150. For example, the browser 110 can execute one or more scripts 160 of the page data and display page content 170 in the graphical user interface of the browser 110 based on the results of the scripts 160, gather, send, or store data on the client device based on the scripts 160, or the like. In some implementations, the browser 110 supports scripts 160 in a language such as JavaScript and can execute the scripts 160 as the page data 150 is being rendered by the page render module 130. In other implementations, the methods discussed herein can be used to monitor initiating scripts in other contexts, including in systems with no graphical display or scripts 160 from sources other than a webpage.

Through the API module 120, the browser 110 can allow scripts 160 of the page data 150 to access one or more application program interfaces (APIs). APIs accessible through the API module 120 can be stored locally or accessed in any other suitable manner. In some implementations, a script 160 can access an API through an API call which identifies the API and (depending on the API) provides one or more arguments to the API to modify the behavior of the API. The API, on receiving the API call, can then execute one or more actions and, in some cases, provide a return value to the script 160. As used herein, synchronous or "sync" APIs are APIs in the browser 110 that, when called with appropriate arguments, synchronously execute code to perform actions (for example, to calculate a value based on the provided arguments) and store and/or return a value to the script 160, which continues executing based on the returned value. In some implementations, when executing a sync API call, the script 160 is still considered active on the browser 110 and the continued execution of the script 160 is conditional on the result of the API call. For example, the script 160 can wait until the sync API call is complete to execute the next line of code in the script 160. Therefore, the API call is executed "synchronously" with the script 160, as the API call and return value are performed in an expected sequence with the other actions of the script 160, according to some embodiments.

Asynchronous or "async" APIs, as used herein, are APIs in the browser 110 that, when called, ask the browser 110 to execute a callback function when the async API detects that a trigger condition is met. As used herein, a callback function (or "callback") is code executed based on a trigger condition of an async API call and can be provided to the async API as an argument. In some implementations, the choice of async API (and some provided arguments) can set the trigger condition(s) defining the timing of a desired action, while the callback function (also provided as an argument) defines the desired action. A callback can include code, calls to other functions or APIs, or other actions. Therefore, after the initial API call, the execution of an async API is independent of (and executed asynchronously with) the execution of the script 160 calling the async API. Async APIs can trigger a callback for any reason (depending on the async API), for example, based on a certain event being observed or after a preset period of time. The callback associated with an async API call executes at the time the correct trigger conditions are met, and can trigger after the script 160 which originally called the async API has finished executing or is no longer active. In some embodiments, an API can exhibit a mixture of synchronous and asynchronous behavior depending, for example, on provided arguments or the specific situation when the API is called.

The page render module 130 can interpret received page data 150, execute scripts 160 of the page data 150, and generate a graphical user interface of the browser 110 for display based on the scripts 160 and page content 170 of the page data 150. For example, the page render module 130 can execute one or more scripts 160 (which may contain API calls) and based on the returned values of the scripts 160, obtain or select page content 170 to display in the graphical user interface.

The script monitoring module 140 can, in some embodiments, track and log an initiating script 160 for a set of monitored actions, such as API calls (or calls to a specific set of monitored APIs). As used herein, the initiating script for an API call is the script 160 which originally called the API. In the case of API calls involving an async API, the initiating script may be inactive at the time the callback of the async API is executed. In some implementations, the script monitoring module 140 uses a current script function (for example, JavaScript's document.currentScript, which holds a reference to the script that is currently being processed) to determine the active script 160 at the time an API call or other monitored action is being executed. For example, using the current script function during the execution of a sync API call will return the initiating script (which is currently active in the case of a sync API). However, trying to use a current script function during the callback of an async API call may not reliably work, as asynchronous JavaScript code executing in the browser 110 is not a script recognized by the current script function. For example, when the callback of an async API contains code to execute another monitored action (such as a call to a monitored API), current script functions can fail to return an active script. In these circumstances, using a current script function on the callback of an async API call will return a null reference when called inside a function (such as a monitored API call) that was called from an async API callback.

To enable monitoring actions called from async APIs, the script monitoring module 140 can overwrite one or more APIs to store or log the initiating script before executing the async API call. As used herein, an "overwrite" is the action of replacing an existing property or function in the browser with another (for example, an overwrite as supported in JavaScript). For example, an API function can be overwritten with a "wrapper" function which stores a reference to the initiating script before calling the original version of the API function with the appropriate arguments. In some implementations, when a script 160 calls for an API function, the wrapped version of the API function is instead called to enable monitoring by the script monitoring module 140. The wrapped API function can then eventually call the original API function to preserve the functionality of the script 160.

In some implementations (including embodiments using JavaScript), to enable monitoring of initiating script 160 during asynchronous actions, the script monitoring module 140 uses a closure (for example, as implemented by JavaScript) to store the initiating script 160 in an overwritten callback of async APIs. In JavaScript, a closure is a technique for linking a variable to a function (such as an async API callback) such that the function (when called) can access a previously set value of the variable. In some embodiments, a closure is used to associate the callback function of an async API with an indicator of the initiating script of the initial API call. In other implementations, a "bind" can similarly be used to store the initiating script for an async API call.

In some implementations, the page data 150 is code, content, or other data received for the browser 110 to display a webpage (or other source of content). The page data 150 can comprise one or more scripts 160, which may be JavaScript functions or other code. As descried above, scripts 160 can call APIs and/or cause the browser 110 to take other monitored actions monitored by the script monitoring module 140. Page content 170 can be text, graphical content, video content, CSS, or HTML used by the page render module 130 to render a version of the webpage (or other content) for display to a user.

Initiating Script Determination for Synchronous APIs

Figure 2:
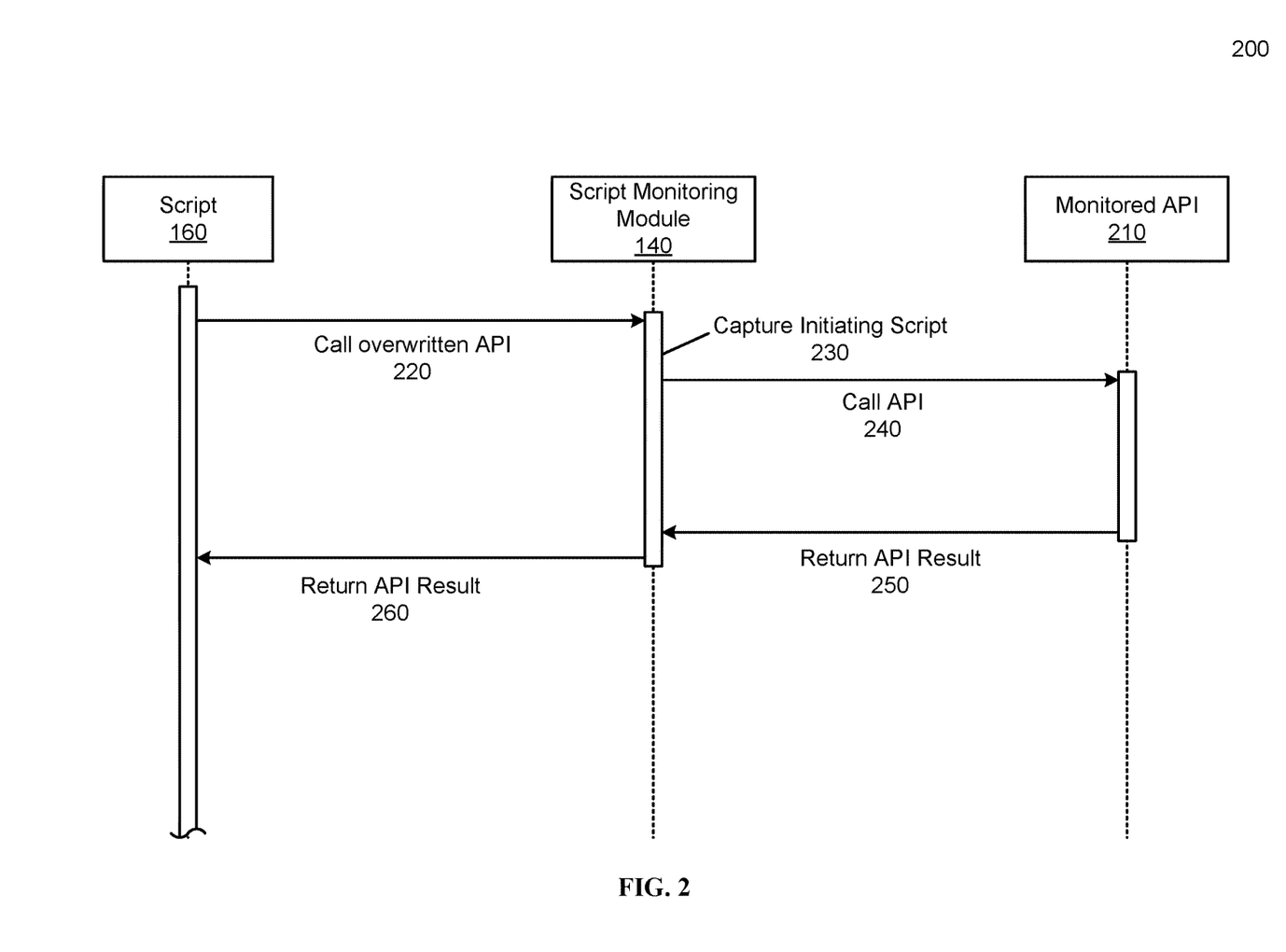
FIG. 2 is an interaction diagram illustrating a process for determining the initiating script for a monitored API call, according to an embodiment.

FIG. 2 is an interaction diagram illustrating a process for determining the initiating script for a synchronous API call, according to an embodiment. The interaction diagram of FIG. 2 comprises a script 160 executing in the browser 110, the script monitoring module 140, and a sync API 210 which is a synchronous API of the API module 120 in the embodiment of FIG. 2.

FIG. 2 discloses a process to determine the initiating script for an example synchronous API (referred to herein as "sync( )"). For example, sync( ) can be a monitored API monitored by the script monitoring module 140. The sync( ) API can take one or more arguments and synchronously return some result. For example, sync( ) can receive an argument of the URL to a resource to fetch and return a value indicting if the retrieval was successful.

To keep track of which script 160 initiated the call to sync( ) the script monitoring module 140 can overwrite sync( ) in the browser 100, for example based on the following logic:

```
let initiatorScript = null;
function getCurrentScript( ) {
    if (document.currentScript) {
        return document.currentScript;
    } else {
        // if there no script that is currently being processed -
        // then document.currentScript is null
        return initiatorScript;
    }
}
// hold a reference to the original sync API function
const realSyncAPI = window['sync'];
window['sync'] = function(url) {
    // use 'document.currentScript' to record which script
    // initiated the call to sync( )
    capture('sync', getCurrentScript( ) );
    // now call the original sync API to perform its natural
    // behavior in the browser as it was being overwritten
    return realSyncAPI(url);
};
```

Here, in the process of FIG. 2, when a script 160 in the page 150 calls the sync( ) API through the browser 110, actually the browser is calls 220 the overwritten version of the API. During the execution of the overwritten API at the script monitoring module 140, the overwritten API captures 230 a reference to the initiating script 160 (for example, as a reference in a variable storing the initiating script). Then, to maintain the correct functionality of the monitored API 210 (here, sync( )), the original monitored API 210 is called 240 from within the overwritten API. After the monitored API 210 executes as normal the API result is returned 250, first to the overwritten API at the script monitoring module 140 and then 260 passed through to the initiating script 160 for use. Therefore, using this process, the script monitoring module 140 can keep track of the initiating script 160 of the synchronous action while maintaining the functionality of the monitored API 210.

Initiating Script Determination with Asynchronous APIs

However, determining the initiating script 160 for a given monitored action can be more complicated when async APIs are involved. If the monitored API is an async API, a process similar to the process described above can be used to track the initiating script. However, if a monitored API is called from within the callback of an async API (or even in during a chain of async APIs) the previously described process will not reliably work. In these cases, code (for example, JavaScript code) that is executed as part of a callback that was registered to be executed asynchronously by the browser 110 (for example, in the case of an async API) is not by default associated with the initiating script 160 that originally called the async API (as a different or no script 160 may be currently being executed depending on when the async API callback was triggered). Therefore, attempting to access the currentScript function (or other current script function) at the time the callback of the async API is being executed without employing additional techniques will result in a null result and leave the script monitoring module 140 without the ability to determine the initiating script from the callback alone.

Figure 3:
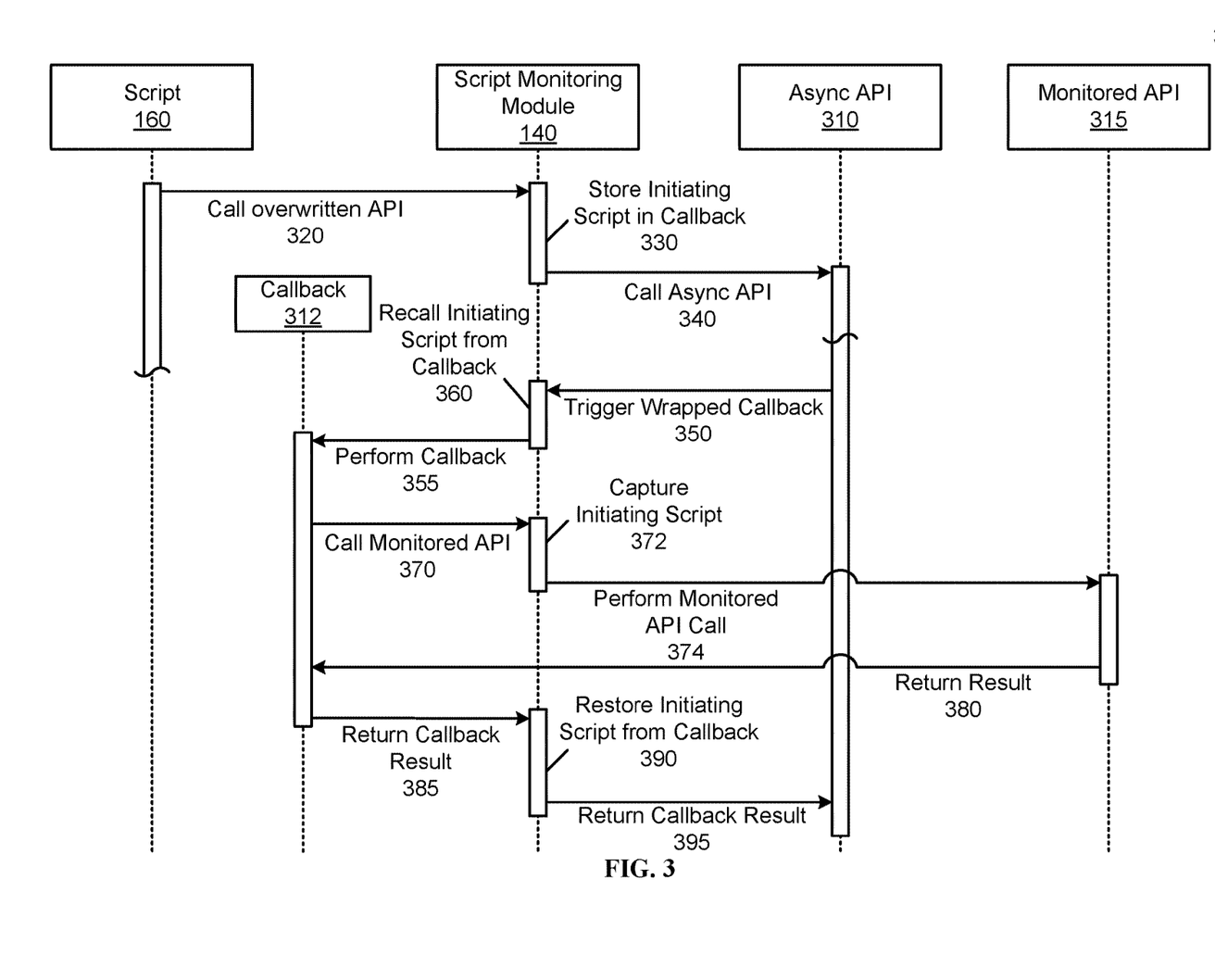
FIG. 3 is an interaction diagram illustrating a process for determining the initiating script for an asynchronous API call, according to an embodiment.

FIG. 3 is an interaction diagram illustrating a process for determining the initiating script for an asynchronous API call, according to an embodiment. The interaction diagram of FIG. 3 comprises a script 160 executing in the browser 110, the script monitoring module 140, an async API 210 which is an asynchronous API of the API module 210 which triggers a callback 312, and a monitored API 315 called by the asynchronous callback 312 of the async API 310 for which the initiating script 160 is tracked.

Therefore, the script monitoring module 140 can overwrite both the initial call to the async API 310 and the callback 312 of the async API 310 with wrapped versions including code that allows the script monitoring module 140 to keep track of the script 160 that initiated the asynchronous action as the callback 312 is executed. FIG. 3 discloses a process to determine the initiating script 160 for an example asynchronous API (referred to herein as "async( )") with an associated callback. For example, the async( ) API can receive arguments including a callback (such as another API call) and a number representing a wait time before executing the callback. To allow the callback of async( ) to be replaced with a wrapped version, the script monitoring module 140 can overwrite async( ) in the browser 100, for example based on the following logic:

```
// hold a reference to the original async API function
const realAsyncAPI = window['async'];
window['async'] = function(callback, time) {
    // create a wrap for the provided callback to report the
    // initiating script and then call the original callback
    const wrappedCallback = getWrappedCallback(callback);
    // now call the real async API using the new wrapped callback as
    // an argument (instead of the original callback)
    return realAsyncAPI(wrappedCallback, time);
};
```

In some embodiments, the getWrappedCallback( ) function generates a wrapped callback (based on the original callback function) that also stores the initiating script 160 (for example, using a closure) for the wrapped callback to reference and report at the time the callback is executed. In some implementations, the callback is overwritten based on the following logic:

```
function getWrappedCallback(callback) {
    // save current script to a local variable
    const cs = getCurrentScript( );
    return function wrappedCallback( ) {
        // now the cs variable storing the initiating script is closured
        // into the wrappedCallback( ) function declared here
        // set the current script to the closured variable
        setCurrentScript(cs);
```

-continued

```
    // now that the currentScript is set, call the original callback
    const returnValue = callback.apply(this, arguments);
    // after original callback finished executing reset the current
        // script property back to the previous value, to preserve the
        // natural behavior of document.currentScript
    revertCurrentScript( );
    // return the return value of the callback
    return returnValue;
};
```

At this point in the process of FIG. 3, when a script 160 of the page data 150 calls the async( ) API through the browser 110, the script 160 is actually calling 320 the overwritten version of the async( ) API which generates a wrapped callback to replace the original callback 312. As the overwritten async( ) executes, a local variable reference to the initiating script 160 is generated (for example, through the document.currentScript feature) and stored 330 into the wrapped callback (for example, using a JavaScript closure) of the overwritten async( ). Then, the original async API 310 is called 340 with arguments instructing it to call the wrapped callback (instead of the original callback 312). The async API 310 continues execution normally and, at some point, triggers 350 the wrapped callback (executed at the script monitoring module 140) responsive to a trigger condition being met. As noted above, in some cases, the script 160 is no longer active at the time the trigger condition is met and the callback is triggered 350.

The wrapped callback function first recalls 360 the reference to the initiating script 160 previously stored (for example, using a closure) when the wrapped callback was generated and sets the stored initiating script 160 as the active script. For example, the wrapped callback can set a global holder variable of the current script referenced by currentScript to the initiating script 160. Therefore, if called during the execution of the wrapped callback (and other code called from within the wrapped callback), the currentScript property will reference the initiating script 160, even though the script 160 may not be active at this point. Next, the script monitoring module performs 355 the original callback 312 provided with the initial call to the async API. In some embodiments any monitored actions taken within the original callback 312 can be associated with the initiating script 160 using currentScript, as the wrapped callback has set the active script to the initiating script 160.

In some implementations, the callback 312 calls 370 a monitored API 315, which may also be overwritten to log (as described above) the initiating script 160. As the currentScript property has be set to reference the initiating script 160, the script monitoring module 140 and overwritten APIs will function as intended and record the initiating script 160 as initiating the monitored API call 370. For example, if sync( ) is the monitored API 315 called within the callback of the async API 310, the line:
    const initiatorScript=getCurrentScript( );
will correctly capture 372 the initiating script 160 into this local variable before performing 374 the monitored API call. Therefore, using this process, getCurrentScript( ) retrieved a reference to the script 160 because of the overwritten version of async( ) (which preserves the current script before letting the browser 110 asynchronously continue the execution of the callback). If the wrapped async API was not used, any references to the currentScript variable may contain null or a reference to the wrong script (as the script 160 may not be the active script at the time the callback 312 is executed). After the monitored API 315 has finished executing and returned 380 a result to the callback 312 (and the callback 312 returns 385 the result to the wrapped callback at the script monitoring module 140), the wrapped callback can restore 390 the currentScript variable to its previous value. In some embodiments, currentScript is reset to preserve the natural behavior of current script function in the browser 110 when not executing overwritten async APIs. In some implementations, no result is returned 380 (depending on the specific async API 310 and the monitored API 315), but the wrapped callback still restores currentScript to its natural value prior to ending execution. Finally, the callback result can be returned 395 to the Async API 310. Therefore, using this process, the script monitoring module 140 can keep track of the initiating script 160 of the asynchronous action while maintaining the functionality of the async API 310 and the use of currentScript outside async API calls.

Figure 4:
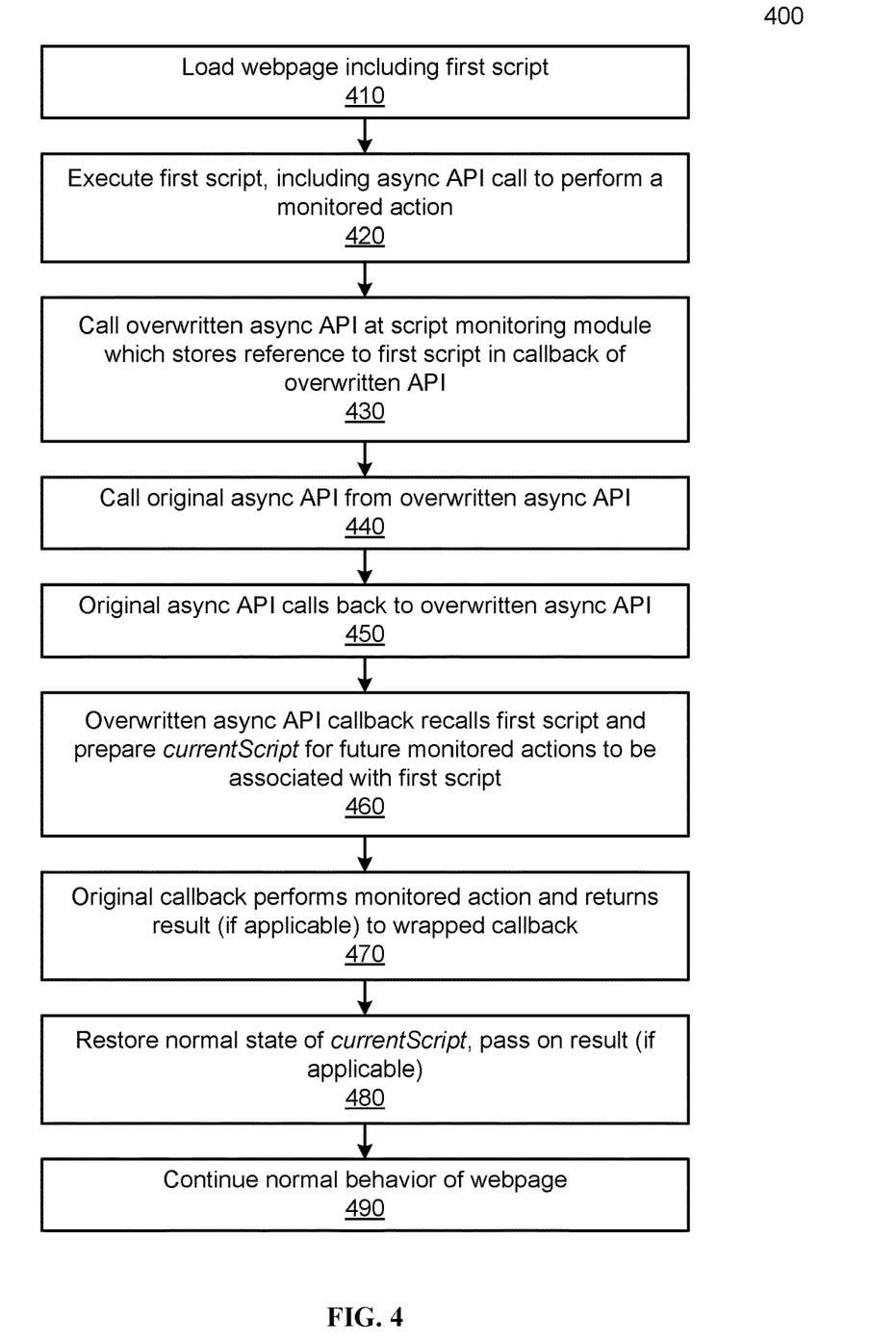
FIG. 4 is a flowchart illustrating a process for monitoring the initiating script for an asynchronous API call, according to an embodiment.

FIG. 4 is a flowchart illustrating a process for monitoring the initiating script for an asynchronous API call, according to an embodiment. The process 400 begins when a browser loads 410 a webpage including a first script and begins to execute 420 the first script. In the embodiment of FIG. 4, the first script includes a call to an async API with a callback including a monitored action. During the execution of the first script, the browser calls 430 an overwritten async API (in place of the original async API in the script) which then detects the first script as the initiating script and stores a reference to the first script in callback of the overwritten API. As described above, a script monitoring module can maintain overwritten version of async APIs to facilitate tracking an initiating script even for actions taken asynchronously. The overwritten API then calls 440 the original async API to perform the functions needed for the script. At some point later, the original async API's trigger condition is met and the original async API calls back 450 to the wrapped callback (the callback of the overwritten async API). During the execution of the wrapped callback, the overwritten async API callback recalls 460 the first script (for example, due to a closured variable), prepares for future monitored actions taken during the callback to be associated with first script (for example, by setting a currentScript property to reflect the first script), and calls the original callback of the API call. When the original callback performs 470 the monitored action, the browser can capture the association of the monitored action with the first script (due to the wrapped callback, as discussed above). The result (if applicable) of the original callback can then be passed to the wrapped callback, which restores 480 the natural value of any variables set to associate future actions with the first script (such as currentState) and further passes through any result of the original callback. Then, the browser continues 490 to present the webpage or execute further scripts.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   loading, by a browser on a client device, a webpage comprising a set of scripts for execution by the browser;
   executing, by the browser as part of executing a first script of the set of scripts, a call to a first asynchronous API comprising a set of arguments and a first callback function that is to be executed upon a trigger condition, the execution of the call to the first asynchronous API comprising:
      calling an overwritten first asynchronous API using the set of arguments and the first callback function;
      generating, by the overwritten first asynchronous API, a wrapped callback function comprising an identification of the first script and a call to the first callback function; and
      calling, by the overwritten first asynchronous API, the first asynchronous API using the set of arguments and the wrapped callback function;
   detecting, by the first asynchronous API, that the trigger condition is met; and
   upon the detection of the trigger condition, executing by the first asynchronous API, the wrapped callback function comprising:
      setting, by the wrapped callback function, a current script variable back to the first script based on the identification of the first script; and
      executing the first callback function.

2. The method of claim 1, further comprising restoring the current script variable to a previous value.

3. The method of claim 1, wherein executing the first callback function comprises:
   calling a first synchronous API;
   referencing the current script variable to determine a current script; and
   storing an association between the first script and the first synchronous API.

4. The method of claim 1, wherein executing, by the first asynchronous API, the wrapped callback function occurs after execution of the first script has finished.

5. The method of claim 1, wherein generating, by the overwritten first asynchronous API, a wrapped callback function comprising the identification of the first script and a call to the first callback function comprises using a closure to store a reference to the first script.

6. The method of claim 1, wherein generating, by the overwritten first asynchronous API, a wrapped callback function comprising the identification of the first script and a call to the first callback function comprises using a bind to store a reference to the first script.

7. A non-transitory computer-readable storage medium comprising instructions which, when executed by a processor, cause the processor to perform the steps of:
   loading, by a browser on a client device, a webpage comprising a set of scripts for execution by the browser;
   executing, by the browser as part of executing a first script of the set of scripts, a call to a first asynchronous API comprising a set of arguments and a first callback function that is to be executed upon a trigger condition, the execution of the call to the first asynchronous API comprising:
      calling an overwritten first asynchronous API using the set of arguments and the first callback function;
      generating, by the overwritten first asynchronous API, a wrapped callback function comprising an identification of the first script and a call to the first callback function; and
      calling, by the overwritten first asynchronous API, the first asynchronous API using the set of arguments and the wrapped callback function;
   detecting, by the first asynchronous API, that the trigger condition is met; and
   upon the detection of the trigger condition, executing, by the first asynchronous API, the wrapped callback function comprising:
      setting, by the wrapped callback function, a current script variable back to the first script based on the identification of the first script; and
      executing the first callback function.

8. The non-transitory computer-readable storage medium of claim 7, wherein the steps further comprise the step of restoring the current script variable to a previous value.

9. The non-transitory computer-readable storage medium of claim 7, wherein executing the first callback function comprises:

calling a first synchronous API;

referencing the current script variable to determine a current script; and storing an association between the first script and the first synchronous API.

10. The non-transitory computer-readable storage medium of claim 7, wherein executing, by the first asynchronous API, the wrapped callback function occurs after execution of the first script has finished.

11. The non-transitory computer-readable storage medium of claim 7, wherein generating, by the overwritten first asynchronous API, a wrapped callback function comprising the identification of the first script and a call to the first callback function comprises using a closure to store a reference to the first script.

12. The non-transitory computer-readable storage medium of claim 7, wherein generating, by the overwritten first asynchronous API, a wrapped callback function comprising the identification of the first script and a call to the first callback function comprises using a bind to store a reference to the first script.

13. A system comprising:

a processor; and a non-transitory computer-readable storage medium comprising instructions which, when executed by the processor, cause the processor to perform the steps of:

loading, by a browser on a client device, a webpage comprising a set of scripts for execution by the browser;

executing, by the browser as part of executing a first script of the set of scripts, a call to a first asynchronous API comprising a set of arguments and a first callback function that is to be executed upon a trigger condition, the execution of the call to the first asynchronous API comprising:

calling an overwritten first asynchronous API using the set of arguments and the first callback function;

generating, by the overwritten first asynchronous API, a wrapped callback function comprising an identification of the first script and a call to the first callback function; and calling, by the overwritten first asynchronous API, the first asynchronous API using the set of arguments and the wrapped callback function;

detecting, by the first asynchronous API, that the trigger condition is met; and upon the detection of the trigger condition, executing by the first asynchronous API, the wrapped callback function comprising:

setting, by the wrapped callback function, a current script variable back to the first script based on the identification of the first script; and executing the first callback function.

14. The system of claim 13, wherein the steps further comprise the step of restoring the current script variable to a previous value.

15. The system of claim 13, wherein executing the first callback function comprises:

calling a first synchronous API;

referencing the current script variable to determine a current script; and storing an association between the first script and the first synchronous API.

16. The system of claim 13, wherein executing, by the first asynchronous API, the wrapped callback function occurs after execution of the first script has finished.

17. The system of claim 13, wherein generating, by the overwritten first asynchronous API, a wrapped callback function comprising the identification of the first script and a call to the first callback function comprises using a closure to store a reference to the first script.

18. The method of claim 1, wherein the identification of the first script comprises a reference to the first script.

19. The method of claim 1, wherein, after the call to the first asynchronous API, execution of the first asynchronous API occurs independently of and asynchronously with execution of the first script.

\* \* \* \* \*